(12) United States Patent
Steinmetz et al.

(10) Patent No.: US 6,200,214 B1
(45) Date of Patent: Mar. 13, 2001

(54) TONGUE CONNECTION

(75) Inventors: H.-J. Steinmetz, Böblingen; Heinz Krzystetzko, Erzhausen, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/406,309

(22) Filed: Sep. 27, 1999

(30) Foreign Application Priority Data

Sep. 29, 1998 (DE) .............................. 198 44 525

(51) Int. Cl.[7] ....................................... B60H 1/34
(52) U.S. Cl. ............................. 454/152; 454/143
(58) Field of Search ............................ 454/152, 154, 454/155, 143

(56) References Cited

FOREIGN PATENT DOCUMENTS

4016026 * 11/1991 (DE) .
0271706 * 6/1988 (EP) .

* cited by examiner

Primary Examiner—Harold Joyce
Assistant Examiner—Derek S. Boles
(74) Attorney, Agent, or Firm—Martin A. Farber

(57) ABSTRACT

The invention relates to a tongue connection, in particular for fixing an air vent on a wall in a passenger compartment, on a basic body which is to be arranged in a releasable manner on a border of a wall opening by way of at least two tongues which project from the basic body, the tongues engaging, along the opening border, in the opening and restricting movement of the body in the direction of the opening plane. There is provided on at least one tongue a (radial) protrusion which projects outward in the direction of the opening border, cuts into the opening border when the basic body is installed on the wall, and prevents movement of the basic body in the opening plane by producing a form fit in relation to the opening border.

10 Claims, 2 Drawing Sheets

TONGUE CONNECTION

FIELD AND BACKGROUND OF THE INVENTION

The invention relates to a tongue connection, in particular for fixing an air vent on a wall in a passenger compartment.

Such a tongue connection is known from EP 0271 706 B1 and relates to a vent for supplying air to windows. Said document discloses an approximately box-like vent frame on which four latching tongues are integrally formed. The vent frame can be secured in through-passages of a corresponding bodywork part by means of said latching tongues, the latter engaging behind an opening border of the wall and preventing movement of the vent frame in the direction perpendicular to an opening plane.

A further tongue connection of the basic type can be found in DE 40 16 026 C2, this relating to a device for supplying air to the interior of a vehicle. This document outlines a housing which has arranged on its front side, which is designed as a flange, clip elements which serve for clipping the entire air vent in a cutout of a wall. These clip elements too engage behind an opening border of the wall and thus ensure that the housing is secured in the direction perpendicular to an opening plane of the cutout.

SUMMARY OF THE INVENTION

The object of the invention is to provide a tongue connection which is of the above type and which allows improved fixing of a basic body on a border of a wall opening.

In the case of the tongue connection according to the invention, it is provided on at least one tongue a (radial) protrusion which projects outward in the direction of the opening border, cuts into the opening border, when the basic body is installed on the wall, and prevents movement of the basic body in the opening plane by producing a form fit in relation to the opening border. As a result, in addition to the task of restricting the movement of the basic body in the direction of the opening plane, the tongue can also easily assume the task of securing the basic body in the direction of the opening plane without a separate component being necessary. For example, a rotationally symmetrical basic body can thereby be secured against a rotary movement within a wall opening adapted to it. It should also be conceivable for a basic body with four or more sides to be secured in a specific position, for example, against linear movement within an elongate slot opening.

A further advantage is that the form-fitting connection can easily be produced, for example by subjecting the basic body to a force in the direction approximately perpendicular to the opening plane, it also being easily possible for the basic body to be removed subsequently.

Advantageous embodiments of the tongue connection according to the invention along with expedient developments of the invention are specified in the subclaims.

Thus, it has proven favorable if the tongue can be braced radially with the opening border, as a result of which, in addition to being secured in the direction of the opening plane, the basic body can also be fixed by the tongue in the direction approximately perpendicular to the opening plane.

This additional securing of the basic body may also be achieved in that at least one tongue has an additional latching nose by means of which the basic body can be fixed on the wall approximately in the direction perpendicular to the opening plane.

If the basic body is of annular design, and if four tongues, offset by in each case approximately 90° with respect to one another, are integrally formed on it, then the basic body may be secured in position, and against rotation, in the direction of the opening plane particularly firmly in a wall opening of circular design. If, in this case, all four tongues each have a radial protrusion, this results in particularly stable securing against rotation within the circular wall opening.

It has also proven particularly favorable, in a further configuration of the invention, if the vertically extending radial protrusion is designed in the manner of a cutting edge at least in certain areas, this making it possible for the protrusion to cut easily in the opening border. The cutting-in operation functions particularly well, in particular, when the material of the opening border is softer than that of the protrusion.

In addition, the cutting-in operation may be improved in that the cutting portion of the respective radial protrusion is of filetooth-like or sawtooth-like design, as a result of which material can easily be removed at the opening border.

It is particularly advantageous for the four tongues to be of resilient design and each to be provided with a latching nose which projects radially beyond a top portion located above, this making it possible to achieve particularly stable securing of the basic body in the direction perpendicular to the opening plane. A further advantage of this configuration is that it is possible for the radial protrusion, during installation, to cut into the opening border of the wall not just in the approximately vertical direction in relation to the opening plane, by an installation force, but also in the horizontal direction, by the spring force of the tongue.

If, in this case, in each case one installation lug, which is directed inward in the direction of the center axis of the annular basic body, is integrally formed on the four resilient tongues, then the basic body can easily be centered on the wall opening and can easily be installed by the basic body being subjected to a relatively small force in the direction of the wall opening.

Finally, it has proven particularly advantageous for an air vent with an annular base body, a rotatable rotary base and a spherical vent to be arranged in the wall opening with the aid of the tongue connection, it being the case that the air vent can be installed particularly easily and is of an attractive and expedient configuration.

BRIEF DESCRIPTION OF THE DRAWINGS

Further advantages, features and details of the invention can be gathered from the following description of a preferred exemplary embodiment and with reference to the drawings, in which.

DETAILED DESCRIPTION OF THE PREFERRED EMBODIMENT

Figure 1:
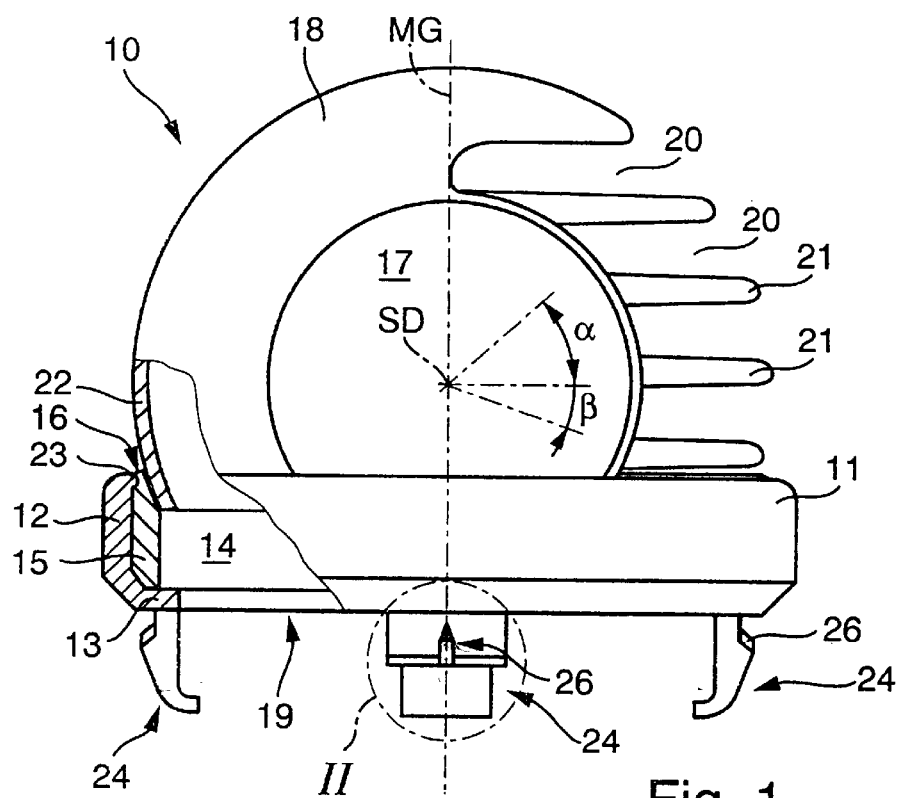
FIG. 1 shows a side view of an air vent with a basic body and tongues, projecting from the latter, of a tongue connection according to the invention.

FIG. 1 shows an air vent 10 which has an annular basic body 11 with a center axis MG. The annular basic body 11 is illustrated in cut-away form to the left of a cut-off line and—as can be seen in the cut-away portion—has an approximately L-shaped cross-section with a side portion 12 and a bottom portion 13. The basic body 11 receives a rotary base 14, which can be rotated about the center axis MG and is adapted to the basic body 11 in the region of the side portion 12 and of the bottom portion 13 by way of a base ring 15. In this case, the rotary base 14 can be adjusted in latching steps in relation to the basic body 11 by means of a latching device (not shown) or by latching teeth. The basic body 11 may—as is shown here—have a circumferential protrusion 23, by means of which the rotary base 14 is received in the basic body 11 in an axially secured manner. Integrally formed on a top end surface 16 of the base ring 15 are two upwardly projecting base lugs 17, which are designed essentially in the form of segments of a circle. The two base lugs 17, which are arranged diametrically in relation to the center axis MG, receive a spherical vent 18 such that it can be pivoted about a pivot axis SD. The pivot axis SD preferably runs in the center of the base lugs 17 and approximately normal to the center axis MG and parallel to a bottom surface 19 of the basic body 11. Provided between the base lugs 17 and the spherical vent 18 are latching teeth or latching devices (not illustrated) by means of which the spherical vent 18 can be pivoted in latching steps, out of the central position shown, through an angle α of approximately 40° in the upward direction and through an angle β of approximately 25° in the downward direction. The spherical vent 18 is designed approximately in the form of a segment of a sphere and has air-outlet openings 20, which extend approximately between the base lugs 17 and are each bounded in the upward and downward directions by directing walls 21 which are fastened on an outer wall 22 of the spherical vent 18 and are provided for the directed distribution of the air emerging into the passenger compartment, the spherical vent 18 being designed to be open at its bottom end for the purpose of letting in the air. The directing walls 21 are adapted in shape to the outer contour of the spherical vent 18, with the result that the latter gives a spherical impression overall. Integrally formed on the bottom surface 19 of the annular basic body 11 are four tongues 24 which project downward from said basic body, are integrally formed so as to be offset in each case by 90° with respect to one another, and have the same radial spacing in each case in relation to the center axis MG.

Figure 2:
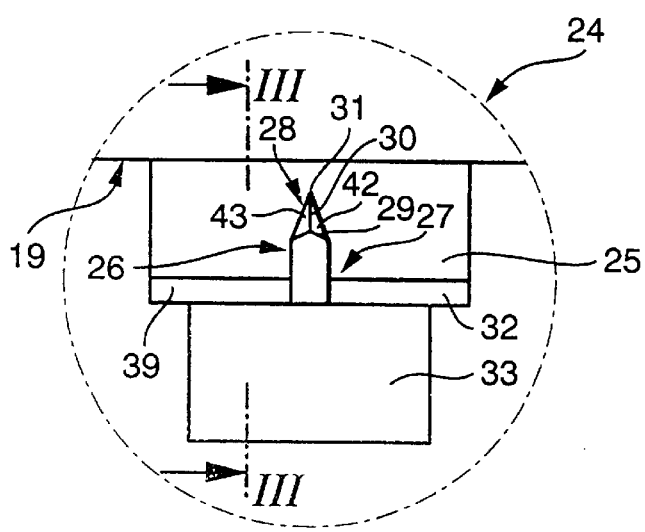
FIG. 2 shows an enlarged illustration of one of the projecting tongues of the tongue connection according to the invention in accordance with the detail II in FIG. 1.
Figure 3:
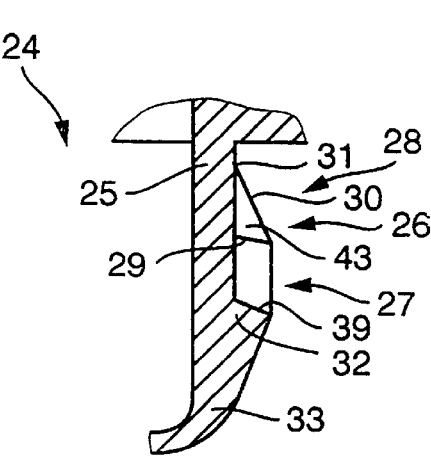
FIG. 3 shows a lateral sectional view of the projecting tongue of the tongue connection according to the invention along section line III—III in FIG. 2.

FIGS. 2 and 3 illustrate one of the projecting tongues 24, in accordance with detail II in FIG. 1, respectively in a front view (FIG. 2) and in a lateral sectional view (FIG. 3) along section line III—III in FIG. 2. The tongue 24 is integrally formed on the bottom portion 13 of the basic body 11 by way of a top portion 25, which has an outwardly projecting radial protrusion 26. The radial protrusion 26 runs vertically and comprises a bottom web portion 27 and a cutting portion 28 arranged above the latter. The web portion 27 is of constant width and thickness over its entire height and merges into the cutting portion 28 at a transition edge 29. The cutting portion 28 has a cutting edge 30 which extends from the transition edge 29 to a top point 31 of the radial protrusion 26, the cutting portion 28 tapering both in width and in thickness from the transition edge 29 and running to a point in the direction of the top point 31. This forms, in the region of the cutting portion 28, a left-hand cutting surface 42 and a right-hand cutting surface 43, which are approximately triangular and are of smooth design in this case. However, it should also be possible for the cutting surfaces 42, 43 to be provided with fileteeth, in order to allow the radial protrusion 26 to cut in more easily. It is also possible for the cutting edge 30 to be provided with sawteeth for the purpose of improving the cutting action.

At the bottom end of the top portion 25, the tongue 24 comprises a latching nose 32, which projects beyond the top portion 25 in the radially outward direction. The latching nose 32 terminates, on the outside, approximately flush with the web portion 27 of the radial protrusion 26 and has an outwardly and downwardly inclined latching surface 39.

The bottom end of the tongue 24 forms an installation lug 33, which is formed integrally with the top portion 25 and the latching nose 32. The installation lug 33 is reduced somewhat in width in relation to the top portion 25 and—as can be seen in FIG. 3—is bent inward in the direction of the axis of rotation MG of the basic body 11.

Figure 4:
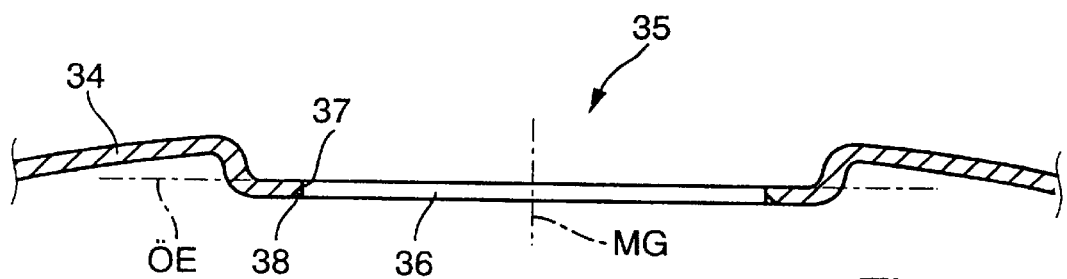
FIG. 4 shows a sectional view of a wall with a wall opening, illustrated on a reduced scale, on the underside of which it is possible to see four incisions introduced by the tongues.

FIG. 4 illustrates a sectional view of a wall 34 with a somewhat sunken bead 35, in which the wall 34 has an opening 36 passing through it. The wall opening 36 is of circular design and is adapted in diameter approximately to the outer sides of the top portions 25 of the tongues 24. The wall opening 36 is introduced into the wall 34 approximately perpendicularly, a border 37 of the wall opening 36 likewise extending approximately perpendicularly to the wall 34. On the top side of the wall 34, an opening plane ÖE extends in the bead 35, the bottom surface 19 of the basic body 11 coming to rest thereon when the air vent 10 is installed.

Figure 5:
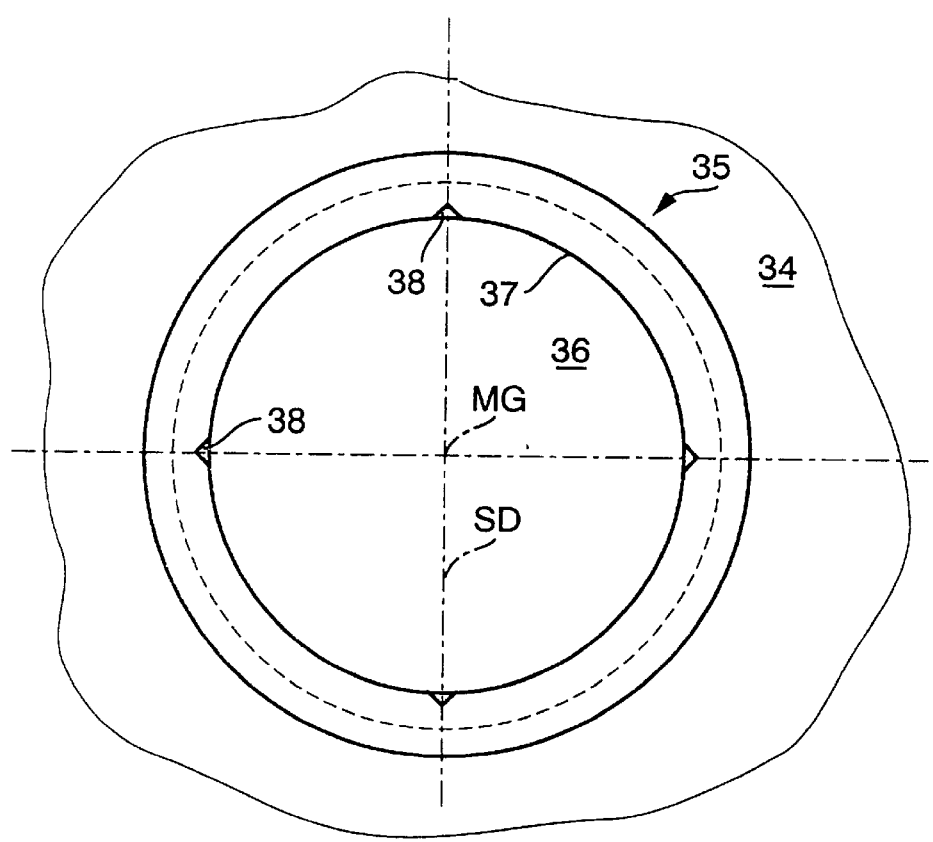
FIG. 5 shows a bottom view of the wall opening with the incisions according to FIG. 4.

On the underside of the wall 34, it is possible to see in the opening border 37—and this can also be seen in FIG. 5—for incisions 38 which are offset by in each case approximately 90° with respect to one another and have been cut into the opening border 37 by the radial protrusions of the installed, and subsequently removed, air vent 10. The incisions 38 thus correspond in shape to the cutting portion 28 of the tongues 24 and—as can be seen in FIG. 4—in longitudinal section are cut in approximately in the form of triangles on the underside of the opening border 37. FIG. 4 shows that the cross-section of the incisions 38 is also approximately triangular.

Figure 6:
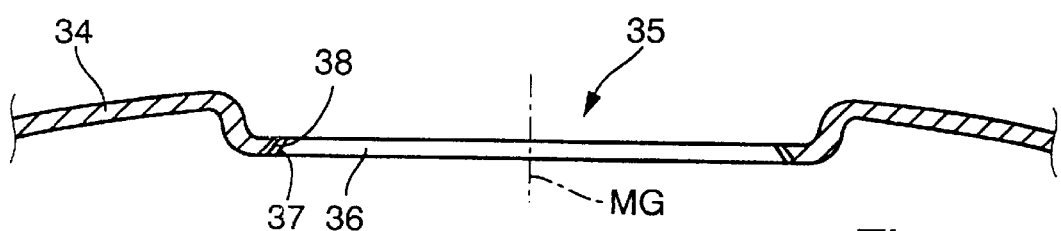
FIG. 6 shows a section view of a further wall with a wall opening (illustrated on a reduced scale), on the underside of which it is possible to see the incisions introduced by the tongues.

The opening border 37 illustrated in FIG. 6 widens outward in the direction of the underside of the wall 34, with the result that the incisions 38 introduced into the opening border 37 by the cutting portions 28 of the tongues 24 run approximately over the entire height of the opening border 37, and approximately parallel to the latter. The cross-section of the incisions 38, once again, is approximately triangular.

The air vent is installed as follows:

Since the wall opening 36 corresponds in diameter approximately to the diameter of the tongues 24 on the outside of their top portion 25, the air vent 10 can be centered on the top side of the wall opening 36 by being placed in position by way of the inwardly directed installation lugs 33 of the tongues 24. If the air vent 10 is then forced vertically in the. direction of the wall 34, then the resilient tongues 24 slide downward along the top side of the border 37 of the wall opening 36, the resilient tongues 24 moving inward toward the center axis MG of the basic body 11. Once the tongues 24, following further movement of the air vent 10 in the downward direction, have passed the bottom end of the opening border 37 by way of the latching surfaces 39 and the web portions 27 of the radial protrusions 26, the resilient tongues 24 are *moved outward again and latch in their installation position, as a result of which the basic body 11 is secured perpendicularly to the opening plane ÖE. In this case, the bottom surface 19 of the basic body 11 comes to rest flush on the top surface of the wall 24, which is determined by the opening plane ÖE. By virtue of the tongues 24 moving in the downward and outward directions, the radial protrusions 26 cut into the border 37 of the wall opening 36 by way of their cutting portion 28, with the result that the basic body 11 is braced radially and secured against rotation by a form fit between the radial protrusions 26 and the incisions 38. In the exemplary embodiment shown here, the radial protrusions 26 cut into the opening border 37 of the wall 34 both in the approximately vertical direction in relation to the opening plane ÖE, by an installation force, and in the horizontal direction, by the spring force of the tongue 24. It is thus possible for the incisions 38 to be cut in by the radial protrusions 26 only on the underside of the opening border 37—as in FIG. 4—or parallel to an oblique opening border 37—as in FIG. 6. It would likewise be conceivable for the radial protrusions 26 to cut into the opening border 37 of the wall 34 either only, by an installation force, in approximately the vertical direction in relation to the opening plane ÖE or in the horizontal direction, by the spring force of the tongue 24. In order to allow the incisions 38 to be cut into the opening border 37 of the wall 34, it is also possible for the tongues 24 to be produced from a correspondingly harder material than the wall 34. A basic body 11 formed integrally with the tongues 24 must additionally be formed from a material which ensures the resilient properties of the tongues 24, for example from a relatively brittle polypropylene. An impact-resistant polypropylene is an example of the suitable basic material for the wall 34 in this combination.

What is claimed is:

1. A tongue connection, in particular for fixing an air vent (10) on a wall (34) in a passenger compartment, on a basic body (11) which is to be arranged in a releasable manner on a border (37) of a wall opening (36) by at least two tongues (24) which project from the basic body, the tongues (24) engaging, along the opening border (37), in the wall opening (36) and restricting movement of the basic body (11) in the direction of the opening plane (ÖE), wherein there is provided on at least one tongue (24) a (radial) protrusion (26) which projects outward in the direction of the opening border (37), cuts into the opening border (37), when the basic body (11) is installed on the wall (34), and prevents movement of the basic body (11) in the opening plane (ÖE) by producing a form fit in relation to the opening border (37).

2. The tongue connection as claimed in claim 1, wherein the tongue (24) is formed with the radial protrusion (26) such that the latter can be braced radially with the opening border (37) and fixes the basic body (11) approximately in the direction perpendicular to the opening plane (ÖE).

3. The tongue connection as claimed in claim 1, wherein at least one tongue (24) has an additional latching nose (32) by means of which the basic body (11) can be fixed on the wall (34) approximately in the direction perpendicular to the opening plane (ÖE).

4. The tongue connection as claimed in claim 1, wherein the basic body (11) is of annular design, and four tongues (24), offset by in each case approximately 90° with respect to one another, are integrally formed on it and are adapted in cross-section on the outside to a wall opening (36) of circular design.

5. The tongue connection as claimed in claim 4, wherein the four tongues (24) each have a radial protrusion (26) by means of which the basic body (11) is secured against a rotary movement within the circular wall opening (36).

6. The tongue connection as claimed in claim 5, wherein the radial protrusions (26) are integrally formed on a top portion (25) of the tongue (24), running vertically between the respective latching nose (32) and the basic body (11), and are formed as a cutting edge at least in certain areas.

7. The tongue connection as claimed in claim 6, wherein the cutting portion (28) of the respective radial protrusion (26) is of filetooth-like or sawtooth-like design.

8. The tongue connection as claimed in claim 4, wherein the four tongues (24) are resilient and each has a latching nose (32) which projects radially beyond a top portion (25) located above and by means of which the basic body (11) is secured against a movement in the direction perpendicular to the opening plane (ÖE).

9. The tongue connection as claimed in claim 4, wherein in each case one installation lug (33), which is directed inward in the direction of the center axis (MG) of the annular basic body (11), is integrally formed on the four resilient tongues (24).

10. The tongue connection as claimed in claim 1, wherein an annular basic body (11) receives a rotary base (14) which can be rotated about an axis of rotation (MG) of the basic body (11), said axis of rotation running approximately perpendicularly to the opening plane (ÖE), and in which a spherical vent (18) is received such that it can be pivoted about a pivot axis (SD) running approximately parallel to the opening plane (ÖE).

* * * * *